United States Patent [19]

Urdal

[11] Patent Number: 4,526,256

[45] Date of Patent: Jul. 2, 1985

[54] CLUTCH MECHANISM

[75] Inventor: Jan Urdal, Hayward, Calif.

[73] Assignee: Schlage Lock Company, San Francisco, Calif.

[21] Appl. No.: 446,967

[22] Filed: Dec. 6, 1982

[51] Int. Cl.³ .................... F16D 13/22; F16D 11/10
[52] U.S. Cl. .................... 192/40; 192/93 R; 192/95; 192/114 R; 192/67 R; 292/347
[58] Field of Search ............ 192/114 R, 93 R, 95, 192/40, 67 R; 70/218, 219, 222, 223, 279; 292/347

[56] References Cited

U.S. PATENT DOCUMENTS

| | | | |
|---|---|---|---|
| 2,021,720 | 11/1935 | French | 192/67 R |
| 3,838,609 | 10/1974 | Denkowski et al. | 192/114 R X |
| 4,022,309 | 5/1977 | Denkowski et al. | 192/114 R X |
| 4,177,657 | 12/1979 | Aydin | 70/219 X |
| 4,429,591 | 2/1984 | Zuch et al. | 192/114 R X |

Primary Examiner—Rodney H. Bonck
Assistant Examiner—David D. House
Attorney, Agent, or Firm—Walter C. Vliet

[57] ABSTRACT

Disclosed is a clutch mechanism suitable for use in an electronic lock. The clutch mechanism requires minimal electronic current draw for operation by utilizing, in part, mechanical power applied to operate the lock to engage the clutch mechanism. A unique camming device in combination with a solenoid released interference shutter accomplishes the object of the invention.

9 Claims, 3 Drawing Figures

CLUTCH MECHANISM

BACKGROUND OF THE INVENTION

The advent of microprocessor logic and its ability to operate with very low power requirements has spawned a large number of applications to remote operations wherein it is impractical to supply other than battery power. In such operations, it is essential to conserve power draw and thereby extend the life of the decision capability of the microprocessor.

One such application has been found in the reprogrammable combination electronic lock. Typical of the aforesaid electronic lock, for which the instant invention defines a ready application, is the "Electronic Lock System" disclosed in U.S. Pat. No. 4,177,657 issued on Dec. 11, 1979 to Kemal Aydin. The latter comprises a battery-powered microprocessor. The use of a battery powered microprocessor eliminates the need for hard wiring doors and further allows such locks to be utilized in remote locations where power is not readily available. A problem in the past has been the amount of power required to engage the locking mechanism once the microprocessor has decided that it is appropriate to do so.

The current draw of the prior art engaging mechanisms has been a deterrent to electronic lock applications.

SUMMARY OF THE INVENTION

The present invention comprises a clutch mechanism which requires extremely low current draw by utilizing, in part, mechanically applied power to assist in engagement of the clutch mechanism. The object of the invention is to provide a clutch mechanism which requires minimal current drain for operation once a decisional command to operate the clutch is received.

A further object of the invention is to provide a simple, reliable and economical clutch mechanism. It is a further object of the invention to provide a clutch mechanism which may be utilized in combination with a microprocessor logic circuit in many applications.

Yet a further object is to provide a clutch mechanism for use with a combination electric lock which may be battery powered.

These and other objects are obtained in a clutch mechanism comprising a first rotary clutch element mounted for rotation about a spindle and having a first jaw element, a second clutch element mounted for translation along and rotation with the spindle and having a second jaw element, a means for resiliently urging the second clutch element towards the first clutch element in response to rotation of the first clutch element, and a means for selectively preventing movement of the second clutch means towards the first clutch means whereby the first and second jaw elements are prevented from coacting and rotating said spindle.

DESCRIPTION OF THE PREFERRED EMBODIMENT

Figure 1:
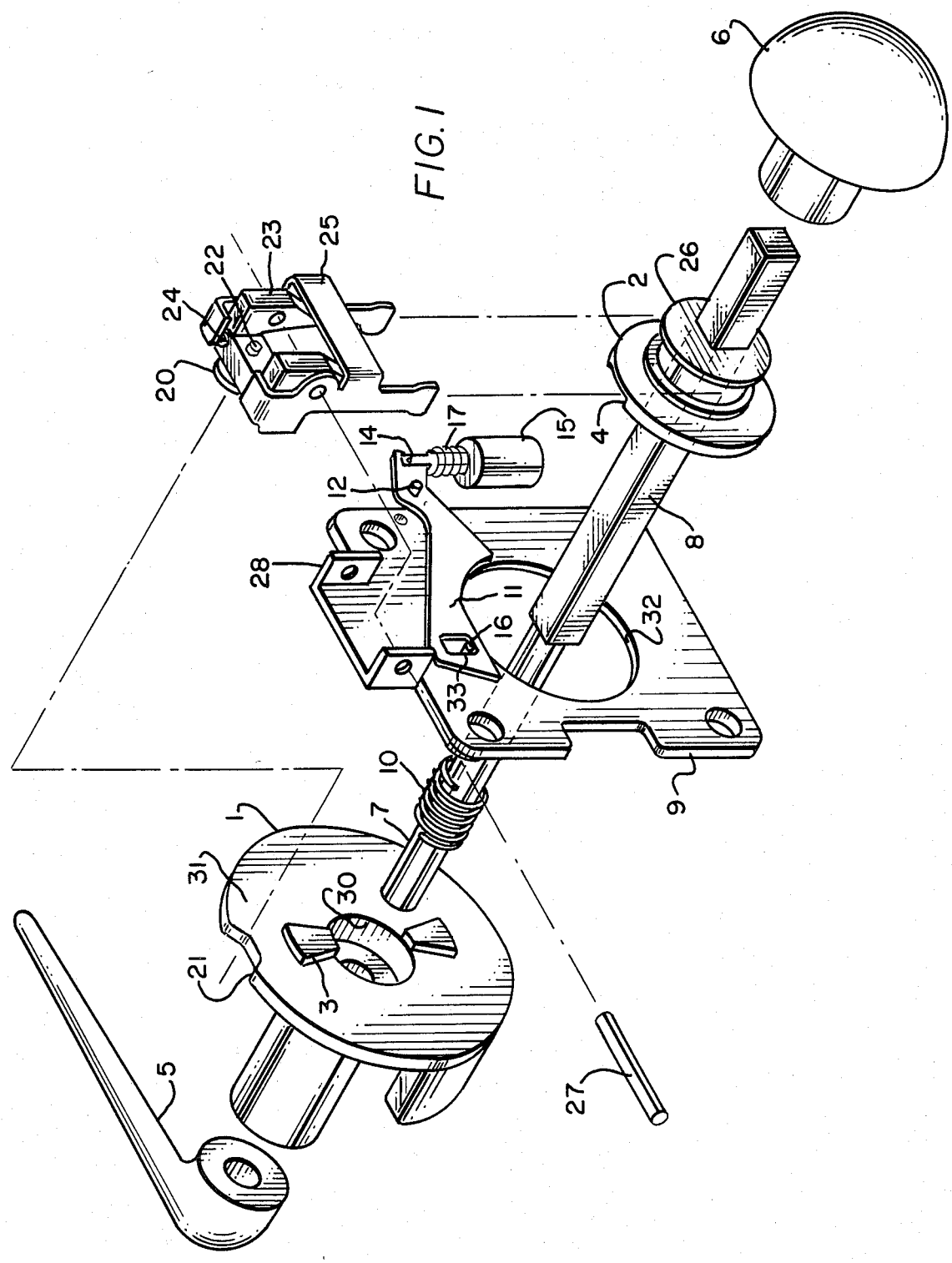
FIG. 1 is an exploded view of the clutch mechanism according to the present invention, as applied to a lock.
Figure 3:
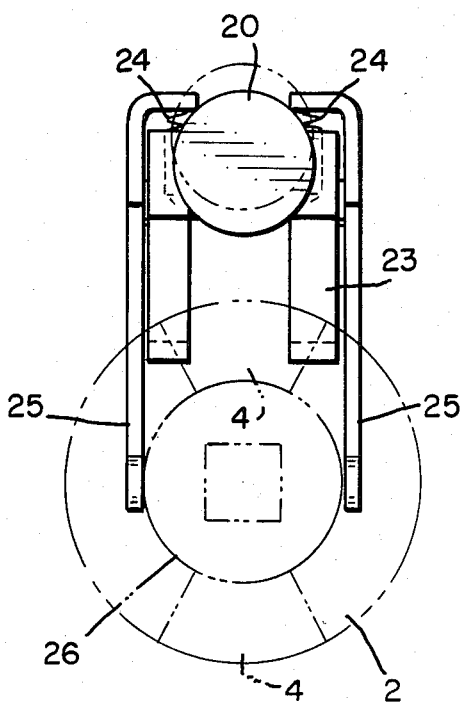
FIG. 3 is an is an elevational view taken from the left hand side of FIG. 2 in which, however, the inner clutch plate is shown only in phantom.
Figure 2:
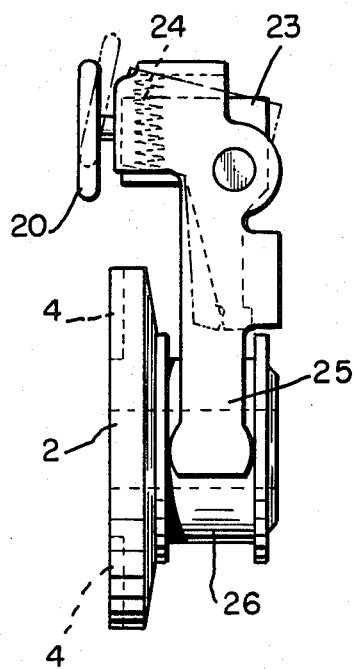
FIG. 2 is a side elevational view in full line illustration of the inner clutch plate, cam follower, follower block, bias springs, and bias arms, the latter shown in engagement with the inner clutch plate, and in dashed outline the cam follower and follower block are shown in a cammed or displaced disposition.

FIGS. 1 through 3 show a clutch mechanism according to the present invention embodied in a door lock mechanism. The door lock mechanism is intended for use with a microprocessor or other logic sequence, or decisional mechanism which would activate a solenoid such as solenoid 15 as depicted in FIG. 1. As will be appreciated by those skilled in this art, the solenoid could also be actuated by a simple battery and switch arrangement.

It is intended that the power requirements necessary to operate solenoid 15 be minimal. It is also intended that the clutch mechanism, which engages the outer handle with the spindle, derive its energy of operation primarily from rotation of the outer handle. Further, it is intended that engagement of the clutch mechanism will enable rotation of the lock actuating spindle by the outer handle. The lock may be of any convenient or conventional configuration which utilizes a rotary spindle to operate the latching mechanism.

Referring now to FIG. 1, the clutch mechanism according to this invention is comprised of an outer clutch plate 1, which is mounted for rotation about a cylindrical portion of an outside spindle 7. In mounting, the outer clutch plate 1 will not be free to translate axially along the outer spindle 7.

An outer lever handle 5 is shown attached to the outer clutch plate 1 for rotation therewith by means not shown. It should be understood that outer handle 5 may be manufactured as part of the outer clutch plate 1 or attached thereto by any convenient means.

The outer clutch plate is provided with a set of opposed outer jaws 3 and an operating cam 21 disposed on the outside periphery of the outer clutch plate 1.

A coacting inner clutch plate 2 is mounted on an inside spindle 8 of square cross section. The inner clutch plate 2 rotates with the spindle 8 and is free to translate axially along the spindle from an inner position to an outer position wherein a coacting female jaw member 4 engages the outer jaw member 3. It should be appreciated by one skilled in the art that rotation of the outer handle and outer clutch plate will not rotate the outer spindle, and the inner spindle will not rotate until the inner clutch plate is moved towards the outside and the coacting jaws of the clutch engage. Once engaged, the inner spindle 8 may be rotated by the outer handle 5.

A coil spring 10 is disposed about the outer spindle 7 and centered partially in a recess 30 formed in the face of the outer clutch plate 1. The purpose of coil spring 10 is to yieldingly urge the inner clutch plate 2 out of engagement with the outer clutch plate 1. A mounting plate 9 forms a positioning base for the lock mechanism.

FIG. 1 is an exploded view of the mechanism according to the present invention, and it should be appreciated that on assembly, the face 31 of the outer clutch plate 1 would be in close proximity or contact with the outer face of the mounting plate 9, with the outer clutch jaws concentric with and extending partially into the hole 32 of the mounting plate. The peripheral diameter of the inner clutch plate 2 is slightly smaller than the diameter of the hole 32 so as to allow it to enter the hole to permit engagement of the jaws.

A shutter 11 is shown mounted on mounting plate 9 by means of a shutter pin 12. The mounting allows the shutter 11 to rotate about pin 12. A stop pin 16 fixed in and projecting outwardly from the mounting plate 9, intrudes into a rectangular orifice 33 formed in the shutter 11 to limit rotation of the shutter 11. As shown in FIG. 1, the shutter is in its release or uppermost position which allows the inner clutch plate to contact the outer clutch plate. It should further be appreciated by one skilled in the art that the shutter may be rotated counterclockwise as shown in FIG. 1, in which position it will partially block hole 32 and interfere with the inner clutch plate passing into hole 32.

The position of the shutter 11 is controlled by solenoid 15. The position shown in FIG. 1 is the activated or release position. A solenoid spring 17 urges the shutter 11 counterclockwise to the interference or lock position when the solenoid 15 is not activated. As earlier noted, the solenoid 15 may be activated by means of a battery connected thereto through a simple control switch or it may be actuated by more sophisticated electronics (such as that comprised by the aforecited U.S. Pat. No. 4,117,657). Such solenoid activating means are merely ancillary to the instant invention. The solenoid plunger is connected to the shutter 11 by means of a solenoid pin 14.

The unique mechanism which urges the inner clutch plate towards the outer clutch plate is comprised of basically five parts—a cam follower 20, a follower block 23, biasing springs 24, bias arms 25, and spool 26. The aforesaid parts, in their cooperative assembled relationships, are shown in FIGS. 2 and 3.

Spool 26 is attached to inner clutch plate 2 and is free to translate axially along spindle 8. Cam follower 20 is provided with a cam shaft 22 which extends into a bearing hole through cam follower 20. The cam follower 20 may be retained by any suitable means, such as a snap ring, on the cam shaft 22.

It should be understood that the cam shaft 22 is free to rotate in its bearing for the preferred embodiment; however, it is not necessary to have the cam follower rotate except as a means of reducing friction to provide ease of operation.

Cam follower 20 is disposed in cam 21 and provides an index means for handle 5 as well as a device to rotate follower block 23 when cam follower 20 is forced out of cam 21 and rides on the peripheral diameter of outer clutch plate 1. Follower block 23 is provided with a pair of bias springs 24. Only the right hand spring is visible in FIG. 1. A corresponding spring is disposed on the left hand side of the follower block 23.

Bias arms 25 are mounted for rotation about the follower block 23 on a common mounting pin 27. With the bias springs 24 interposed between the following block 23 and the bias arms 25, it should be obvious to one skilled in the art that movement of the cam follower and hence the follower block will result in an urging force developed by bias springs 24 to rotate the bias arms in a clockwise direction as viewed from the left of FIG. 1.

The follower block 23 and bias arms 25 are mounted to the mounting plate 9 in a U-shaped saddle 28 by means of the mounting pin 27 as shown. It should be appreciated now that rotation of the handle 5 results in the clockwise rotation of the bias arms which, in turn, coact in the spool 26 to urge the inner clutch plate towards the outer clutch plate.

It should also be appreciated that when the shutter 11 is in its interfering position, relative movement between the follower block 23 and the bias arms 25 is absorbed by the bias springs 24. This permits rotation of the outside handle 5 without rotation of the spindle 8 and operation of the lock.

When solenoid 15 is activated, by some activating means shutter 11 will be rotated out of obstruction of the inner clutch plate and the bias arms will urge the inner clutch plate into engagement with the outer clutch plate when the handle is rotated. As a consequence, the inner and outer jaw members 4 and 3 will come into mutual engagement. Accordingly, further rotation of the handle 5 will cause rotation of the spindle 8. Where the spindle 8 serves as an operating element in a lock, its rotation can be used to effect operation of the lock or its mechanism.

An inner handle 6 directly engages spindle 8 and may be utilized to rotate the spindle directly at any time without engagement of the clutch plates.

It should be obvious to one skilled in the art that numerous modifications of the clutch mechanism as described, and numerous other applications for a clutch mechanism deriving a portion of its operating power from an input drive on selected command, will become apparent. I therefore do not want to be limited in the scope of my invention except as claimed.

I claim:

1. A clutch mechanism, for an electronic lock of the like, comprising:
   a first rotary clutch element, mounted for free rotation about, and relative to, a spindle, having a first jaw element;
   a second clutch element, mounted for translation along, and rotation in common with, said spindle, having a second jaw element engageable with said first jaw element for effecting rotation of one of said clutch elements in response to the rotation of the other of said clutch elements;
   means interposed between said clutch elements normally restraining said clutch elements in spaced-apart disposition;
   means for resiliently urging one of said clutch elements to move towards the other of said clutch elements, in response to rotation of one of said clutch elements to cause said jaw elements to engage; and
   means for selectively preventing movement of said one clutch element towards said other clutch element, whereby said first and second jaw elements are prevented from effecting engagement and rotation of said one clutch element in response to rotation of said other clutch element.

2. A clutch mechanism according to claim 1 wherein one of said clutch elements is provided with a peripheral cam which displaces said urging means.

3. A clutch mechanism according to claim 1 wherein said urging means comprises a cam follower, and means for accumulating lost motion in the event said one clutch element is prevented from movement toward said other clutch element.

4. A clutch mechanism according to claim 3 wherein said accumulating means comprises a spring interposed between a follower block and bias arms.

5. A clutch mechanism according to claim 1 wherein said movement preventing means comprises a shutter means.

6. A clutch mechanism according to claim 5 wherein said shutter means is solenoid operated.

7. A clutch mechanism according to claim 1 wherein said first rotary clutch element is mounted for rotation about a circular shaft and is in face engagement with a mounting plate having a hole therethrough and said second clutch element has a peripheral diameter smaller than said hole in said mounting plate to permit passage therethrough.

8. A clutch mechanism according to claim 1 wherein said movement preventing means further comprises an electrically-operated solenoid.

9. A clutch mechanism according to claim 1 wherein said spindle operates to release a lock mechanism.

* * * * *